United States Patent
Cohn

[11] 3,715,094
[45] Feb. 6, 1973

[54] SIMPLIFIED AIRCRAFT CONTROL SYSTEM

[76] Inventor: Robert L. Cohn, c/o Robert L. Cohn, Inc., 500 N. Michigan Ave., Chicago, Ill. 60611

[22] Filed: June 5, 1970

[21] Appl. No.: 43,663

[52] U.S. Cl. ............................................244/83 B
[51] Int. Cl. ..............................................B64c 13/04
[58] Field of Search ........244/83, 83 B, 90, 83 D, 77, 244/76

[56] References Cited

UNITED STATES PATENTS

| | | | |
|---|---|---|---|
| 2,588,020 | 3/1952 | Libly | 244/83 |
| 2,442,289 | 5/1948 | Garehime | 244/83 |
| 2,005,061 | 6/1935 | Thomas | 244/83 |
| 1,941,616 | 1/1934 | Mueller | 244/83 |
| 1,367,840 | 2/1921 | Tarbox | 244/76 R |
| 1,897,285 | 2/1933 | Veit | 244/77 D |
| 2,597,892 | 5/1952 | Nash | 244/77 D |
| 2,512,902 | 6/1950 | Rossire | 244/77 D X |

*Primary Examiner*—Milton Buchler
*Assistant Examiner*—Carl A. Rutledge
*Attorney*—Alter, Weiss & Whitesel

[57] ABSTRACT

A control system resiliently interconnects aileron and rudder controls. When the aileron is controlled, the rudder is trimmed sufficiently to maintain a desired bank and turn orientation without separately controlling the rudder. For stall minimization the elevator is restricted from moving up to the position where the angle of attack of the air foil is at the burble point.

8 Claims, 4 Drawing Figures

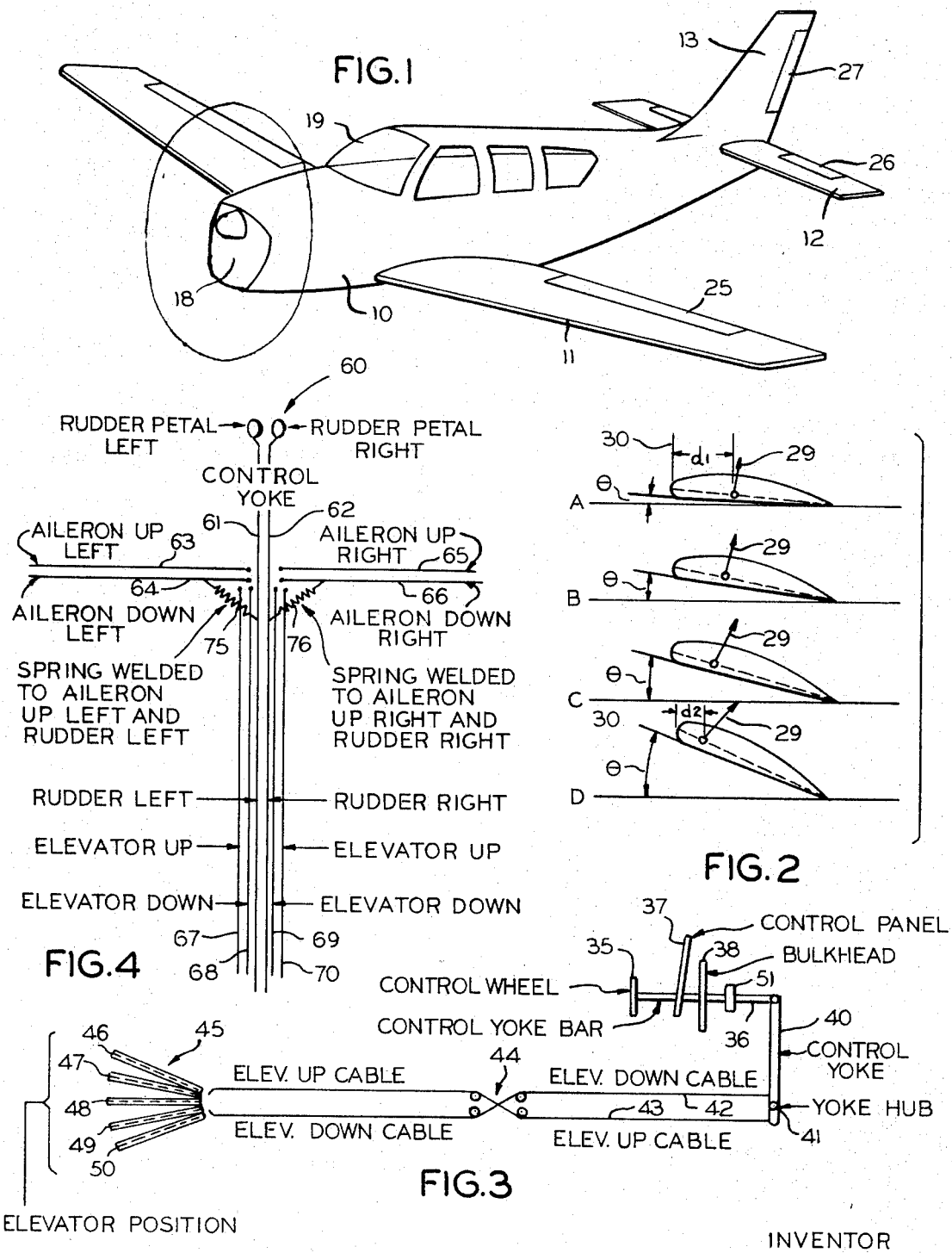

SIMPLIFIED AIRCRAFT CONTROL SYSTEM

This invention relates to easily controlled, stallproof aircraft, and more particularly to aircraft which are completely controllable at virtually all flying speeds.

As the safety of aircraft has increased, the demands upon the skill level of the pilot have also increased. It is incumbent on the aircraft industry to decrease the skill level required while increasing the safety features in order to open the benefits of general aviation to the transportation needs of millions of people. Thus there is a demand for still safer and more easily controlled airplanes.

Accordingly, an object of the invention is to provide new and improved aircraft which cannot go into an uncontrollable stall, even in full "stick-back" mode at any power setting. Here an object is to provide an aircraft which flies completely controllable at any power.

Another object of the invention is to provide an aircraft which is completely controllable, with only a wheel or yoke, at any power setting. In this connection, an object is to provide for separate rudder control which overrides the wheel control during flight, and enables ground steering during take-off, landing and taxiing.

In keeping with an aspect of the invention, these and other objects are provided by a control system which resiliently interconnects aileron and rudder controls. When the aileron is controlled, the rudder automatically trims itself sufficiently to maintain a desired bank and turn coordination. In full "stick-back" mode, the aircraft loses altitude, maintains altitude, or gains altitude depending upon load factors and power settings, and it is controllable with only the wheel or yoke for the duration of the flight. In full "stick-back" mode without power, the aircraft maintains a slightly nose high attitude which protects the nose gear during landing. However, for maximum controllability, the elevator is movable to position the wing angle to within 2° – 4° of the burble point.

The nature of the invention and the manner in which these and other objects are accomplished will become more apparent from a study of the following specification, when taken in connection with the accompanying drawings, in which:

FIG. 1 is a perspective view of an aircraft of the type which might use the inventive control system;

FIG. 2 is a graphical representation of an air foil of an aircraft wing showing the effect of the angle of attack on the pressure center over the wing;

FIG. 3 is a schematic representation of an elevator control system; and

FIG. 4 is a schematic representation of the interaction between the elevator and rudder controls in the inventive system.

Briefly, the airplane of FIG. 1 is shown here since it is the type flown by the average general aviation pilot. However, this type of aircraft is exemplary of almost any kind of airplane which is able to benefit from the teachings of this invention. This airplane has a fuselage 10, wings 11, stabilizer 12, and fin 13. The fuselage includes a power plant 18, a passenger cabin 19, baggage compartment and landing gear (not shown). The wings, stabilizer and tail fin include control surfaces in the forms of ailerons 25, elevator 26, and rudder 27. In addition, any suitable trimming tabs (not shown) may be provided.

Generally, the pilot in cabin 19 controls the flight path by combined movements of a wheel or yoke, rudder pedals and throttle. This requires at least some degree of manual coordination on the part of the pilot since he must pitch, yaw, and roll by the proper interrelated amounts in even a simple climbing turn, for example. Each of these attitude orientations must be so related to the other so that the airplane follows a smooth path free of side slipping, fish tailing, or the like. Or, more seriously, the plane might go into a stall, as explained by FIG. 2.

More particularly, a small force is present on every point of a moving airfoil, which is different in both magnitude and direction from the other forces acting on other points on the airfoil. If all of these small forces are added mathematically, their sum is the resultant force 29 on the airfoil which has magnitude, direction, and location. The point at which the resultant force can be considered as applied to the wing is called the center of pressure.

In actual flight, with control power settings, a change in the angle of attack changes the air speed. However, if a constant velocity of airstream is maintained while changing the angle of attack, the results on a nonsymmetrical wing are as shown in FIG. 2. Here a wing section is shown at various angles of attack to illustrate the effect of these different angles on the resultant force and the position of the center of pressure.

At a positive angle of attack (about 3° or 4°), as shown in FIG. 2A, the resultant has its most nearly vertical direction. Either increasing or decreasing the angle causes the direction of the resultant to move farther from the vertical. In FIG. 2D, the burble point is reached and the airflow becomes rough over the upper wing surface, thereby causing an uneven distribution of pressure. The rough airflow destroys lift causing the airplant to stall and become uncontrollable. The burble point is generally reached when the angle $\theta$ of attack is increased to about 18° or 20°. At smaller angles of attack, the resultant is comparatively small; its direction is upward and back from the vertical; its center of pressure is well back by a distance d1 from the leading edge 30.

As the angle $\theta$ of attack increases from FIG. 2A to FIG. 2D, the center of pressure changes, and the resultant has an upward and backward direction. The pressure center moves progressively nearer to the leading edge 30 to become a distance d2.

From this, it should be apparent that the aircraft wing attitude must be limited to some discrete angle $\theta$ which is well below the burble point. From one viewpoint, it might appear safest to limit the attack angle to stay fairly close (FIG. 2B) to the optimum attack angle $\theta$ (FIG. 2A). However, such a limitation would so restrict maneuverability that the airplane might be less safe than it would be if there were no limitation. Accordingly, I have found it desirable to limit the angle of attack at a high level (FIG. 2C) fairly near the burble point.

In keeping with the invention, the airplane controls are limited to hold the attack angle to approximately 2°-4° below the burble point. In greater detail, FIG. 3 shows a control wheel 35 attached to a control yoke bar which slides through suitable bearings in the control panel 37 and bulk head 38. As the yoke bar 36 slides, it pulls or pushes a control yoke 40 which pivots about a yoke hub 41. A pair of cables 42, 43 run from the control yoke over guiding pulleys 44 to the elevator control surfaces 45.

If the wheel 35 is pulled back, the yoke 40 pivots about hub 41 to release cable 42 and pull cable 43 by equal amounts. If the wheel 35 is pushed, the yoke 40 pivots in an opposite direction to release cable 43 and pull cable 42 again by equal amounts. This cable motion moves the elevator 45 between positions 46–50. It is assumed that the wing 11 reaches an angle of attack where burble occurs when the elevator is raised to the position 46. The position 47 limits the wing angle $\theta$ of attack to a point which is 2°–4° below the burble point. The positions 48–50 are various angles of the elevator during level flight or diving.

According to the invention, a stop collar, or device 51 is mounted on the yoke bar to limit the travel of the control mechanism when the wheel is pulled back. Therefore, the pull on the cable 43 is limited to raise the elevator no higher than the position 47. Within reason, a well designed airfoil burble point is not significantly effected by the aircraft speed. This way even a beginner is not able to stall the airplane by raising the elevator too high.

Another aspect of the invention involves a resilient interconnection between the aileron and rudder controls, as shown in FIG. 4. A pair of rudder pedals 60 are connected to cables 61, 62 which are selectively pulled to cause the rudder to move left or right, respectively. The control wheel 35 selectively pulls or releases the cables 63, 64 by equal amounts, to move the left aileron up or down, respectively. The cables 67–70 are controlled by the control yoke bar 36. Thus, the cables 67, 68 move the left elevator up and down, respectively, while the cables 69, 70 move the right elevator up and down, respectively.

The aileron up control cables 64, 66 are resiliently connected at 75, 76 to the rudder left and right control cables 61, 62, respectively. Therefore, if either aileron cable 64, 66 is pulled to lower one of the airplane wings, there is a resilient tug at the corresponding rudder cable. Hence, the plane tends to turn to the proper direction without slipping when the wing responds to the aileron control.

The resilient connections 75, 76 are preferably coiled springs having a tension selected with respect to the wind forces acting upon the rudder during turns. Thus, when the pilot initiates a turn, a rotation of the control wheel acts through springs 75, 76 to pull the rudder, in a proper direction, with a yielding force. However, if the airplane tends to turn too sharply, the wind resistance on the rudder overcomes the yielding force of the spring tension. The springs 75, 76 stretch to relieve the pressure on the rudder caused by the wind resistance, and the airplane turn eases. Hence, there is a compensation wherein the airplane tends toward an optimum amount of pressure on the rudder control surfaces and this, in turn, tends to cause optimum flying attitudes.

The spring tension at 75, 76 is also selected with a view to the possible need for rudder pedal override. Therefore, if the control wheel is turned, and the pedal is moved, the pedal will easily overcome any forces transmitted through the coupling 75, 76 to the rudder.

Thus, the rudder of the airplane may be maneuvered independently either during flight or while taxiing on the ground.

The override capabilities also enables cross controlling for certain flight conditions, for example where quick loss of altitude is desired without diving, by applying opposite rudder and aileron controls.

The advantages of the invention should now be apparent to those who are skilled in the art. The airplane may be flown with a lesser amount of pilot manual dexterity than was heretofor required. The pilot, who is familiar with driving an auto should be able to fly the airplane with essentially the same skill. Yet, all controls are present for normal flying when such flying is required.

While the controls have been described using cable connections, it should be clearly understood that all electrical, mechanical, or fluidic control means are included in the inventive concept.

While the foregoing refers to a particular embodiment of the invention, it should be understood that the invention is not limited thereto. Quite the contrary, the claims are to be construed to cover all equivalents falling within the true scope and spirit of the invention.

I claim:

1. An airplane control system comprising a plurality of movable control surfaces including aileron, rudder, and elevator surfaces, means for selectively exerting a pulling force upon said airplane along a flight path, and elevator control means independent of the stabilizer of the airplane for selectively positioning the elevator surfaces to control the angle of attack of the wing of the airplane, said elevator control means including mechanical limiting means for mechanically limiting the movement of said elevator surfaces to preclude raising the angle of the attack of the wing of said airplane to the burble point while still enabling sufficient angle of attack to safely maneuver.

2. The control system of claim 1 wherein said elevator control means comprises a control yoke, and wherein said elevator limiting means comprises a stop for limiting the movement of said control yoke.

3. An airplane control system comprising a plurality of movable control surfaces including aileron, rudder, and elevator surfaces, means for selectively exerting a pulling force upon said airplane along a flight path, elevator control means independent of the stabilizer of the airplane for selectively positioning the elevator surfaces that control the angle of attack of the wing of the airplane, said elevator control means including limiting means for limiting the movement of said elevator surfaces to preclude raising the angle of attack of the wing of said airplane to the burble point while still enabling sufficient angle of attack to safely maneuver, a plurality of control cables for separately controlling said aileron and rudder surfaces, and means for resiliently interconnecting said control cables so that a pull upon an aileron simultaneously pulls said rudder with a yielding force.

4. The control system of claim 3 wherein said means for interconnecting said control cables comprises coiled springs.

5. The control system of claim 3 and means for manually overriding said yielding force.

6. An airplane control system comprising aileron and rudder movement control devices resiliently interconnected to move said rudder by a predetermined amount responsive to movement of said ailerons, and
   means for manually overriding the movement of said rudder responsive to the movement of said ailerons.

7. An airplane control system comprising aileron and rudder control devices resiliently interconnected to move said rudder by a predetermined amount responsive to movement of said aileron, and
   means for precluding the stalling of said airplane.

8. An airplane control system comprising aileron and rudder movement control devices resiliently interconnected to move said rudder by a predetermined amount responsive to movement of said aileron, and
   means for limiting the movement of elevators on said airplane to preclude an attitude movement of the wing angle to a point closer than 2° to the burble point angle.

* * * * *